(12) United States Patent
Wakabayashi et al.

(10) Patent No.: US 9,859,804 B2
(45) Date of Patent: Jan. 2, 2018

(54) POWER SUPPLY DEVICE

(71) Applicant: SHINDENGEN ELECTRIC MANUFACTURING CO., LTD., Tokyo (JP)

(72) Inventors: Koji Wakabayashi, Hanno (JP); Konosuke Nitta, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/027,571

(22) PCT Filed: Nov. 29, 2013

(86) PCT No.: PCT/JP2013/082210
§ 371 (c)(1),
(2) Date: Apr. 6, 2016

(87) PCT Pub. No.: WO2015/079565
PCT Pub. Date: Jun. 4, 2015

(65) Prior Publication Data
US 2016/0241152 A1    Aug. 18, 2016

(51) Int. Cl.
*H02M 7/06* (2006.01)
*H02M 3/335* (2006.01)
(Continued)

(52) U.S. Cl.
CPC ......... *H02M 3/33592* (2013.01); *H02M 1/32* (2013.01); *H02M 3/337* (2013.01);
(Continued)

(58) Field of Classification Search
CPC ......... H02M 3/33569; H02M 3/33592; H02M 3/3376; H02M 7/06
(Continued)

(56) References Cited

U.S. PATENT DOCUMENTS

| | | | | |
|---|---|---|---|---|
| 6,128,206 A | * | 10/2000 | Sun | H02M 3/33592 363/127 |
| 7,184,287 B2 | * | 2/2007 | Ying | H02M 1/34 363/126 |

(Continued)

FOREIGN PATENT DOCUMENTS

| | | |
|---|---|---|
| JP | 10-229673 | 8/1998 |
| JP | 2006-191711 | 7/2006 |

(Continued)

OTHER PUBLICATIONS

International Search Report or PCT/JP2013/082210, dated Mar. 4, 2014, 4 pages.

(Continued)

*Primary Examiner* — Nguyen Tran
(74) *Attorney, Agent, or Firm* — Nixon & Vanderhye P.C.

(57) ABSTRACT

A power supply device includes: a rectifier having an input terminal connected to one end of a switching element configured to perform synchronous rectification; a coil having one end connected to an output terminal of the power supply device; and a second capacitor connected in series to a first capacitor, the first capacitor having one end grounded, the second capacitor having one end connected to a connection point between another end of the first capacitor and the one end of the coil, and the second capacitor having another end connected to an output terminal of the rectifier.

5 Claims, 3 Drawing Sheets

(51) Int. Cl.
  *H02M 7/00*  (2006.01)
  *H02M 1/32*  (2007.01)
  *H02M 3/337* (2006.01)

(52) U.S. Cl.
  CPC ... *H02M 3/33546* (2013.01); *H02M 3/33569* (2013.01); *H02M 7/00* (2013.01); *Y02B 70/1475* (2013.01)

(58) Field of Classification Search
  USPC .............. 363/16, 17, 21.14, 125, 126, 127
  See application file for complete search history.

(56) References Cited

U.S. PATENT DOCUMENTS

2003/0067794 A1\* 4/2003 Boylan ............ H02M 3/33592
  363/127
2006/0023479 A1\* 2/2006 Leung ............... H02M 3/33561
  363/97
2006/0139823 A1 6/2006 Shoji et al.

FOREIGN PATENT DOCUMENTS

| JP | 2006-211880 | 8/2006 |
| JP | 2007-181280 | 7/2007 |
| JP | 2009-296770 | 12/2009 |
| JP | 2010-206858 | 9/2010 |
| JP | 2012-110108 | 6/2012 |

OTHER PUBLICATIONS

Japanese Office Action issued in App. No. 2015-550293 dated Nov. 1, 2016 (w/ partial translation).
Chinese Office Action issued in Appln. No. 201380079432.X dated Sep. 18, 2017 (with translation).

\* cited by examiner

POWER SUPPLY DEVICE

This application is the U.S. national phase of International Application No. PCT/JP2013/082210 filed 29 Nov. 2013, which designated the U.S., the entire contents of which is hereby incorporated by reference.

TECHNICAL FIELD

The present invention relates to a power supply device.

BACKGROUND ART

Power supply devices that convert an input DC power into an AC power using switching elements are known. Such a power supply device transforms the convened AC power voltage using a transformer. A circuit on a secondary winding side of the transformer includes a rectifier that rectifies an AC power to be induced by the secondary winding. In such a power supply device, when a direction of a current flowing in the secondary winding is changed, a surge voltage is generated in the rectifier due to leakage flux and the like on the primary winding side and the secondary winding side of the transformer. For example, technology of absorbing the generated surge voltage using a surge absorption circuit connected to the rectifier is disclosed in, for example, Patent Document 1.

Additionally, such power supply devices include a synchronous rectification DC-DC converter that performs, using an FET (Field Effect Transistor), synchronous rectification on the AC power to be induced in a secondary winding. A choke coil is connected to an output of the synchronous rectification DC-DC converter. In a case where a battery is connected to an output terminal of such a synchronous rectification DC-DC converter, a voltage of the battery becomes higher than an output voltage of the synchronous rectification DC-DC converter in some cases. In a case where the voltage of the battery becomes high, backflow occurs in a direction from the battery toward the choke coil and the FET.

CITATION LIST

Patent Document

[Patent Document 1] Japanese Patent Application Laid-Open Publication No. 2007-181280

DISCLOSURE OF THE INVENTION

Problems to be Solved by the Invention

However, in the above-described technology, in a case where backflow occurs in the synchronous rectification DC-DC converter, when control is performed so as to terminate the synchronous rectification operation by the FET, a surge voltage is generated by the energy charged in the choke coil. The above-described technology has had problems in that there is a possibility that an excessive voltage is applied to the FET due to the surge voltage, thus causing a breakdown of the FET.

The present invention has been made in view of the above problem, and has an object to provide a power supply device that can reduce a surge voltage caused by occurrence of backflow.

Means for Solving the Problems

To achieve the above object, a power supply device according to one aspect of the present invention includes: a rectifier having an input terminal connected to one end of a switching element configured to perform synchronous rectification; a coil having one end connected to an output terminal of the power supply device; and a second capacitor connected in series to a first capacitor, the first capacitor having one end grounded, the second capacitor having one end connected to a connection point between another end of the first capacitor and the one end of the coil, and the second capacitor having another end connected to an output terminal of the rectifier. The first capacitor and the second capacitor are configured to voltage-divide a surge voltage to be generated in the switching element by energy charged in the coil.

A power supply device according to another aspect of the present invention includes: a transformer; a first series circuit on a secondary side of the transformer; a second series circuit on the secondary side of the transformer; a third series circuit on the secondary side of the transformer; a coil on the secondary side of the transformer; a control circuit on the secondary side of the transformer. The transformer includes a primary winding, a first secondary winding, and a second secondary winding. The first series circuit includes a first switching element configured to perform synchronous rectification and a first rectifier connected in series to the first switching element. One end of the first secondary winding is connected between the first switching element and the first rectifier. The second series circuit includes a second switching element configured to perform synchronous rectification and a second rectifier connected in series to the second switching element. The second series circuit is connected in parallel to the first series circuit. One end of the second secondary winding is connected between the second switching element and the second rectifier. The third series circuit includes a first capacitor and a second capacitor connected in series to the first capacitor. The third series circuit is connected in parallel to the first series circuit and the second series circuit. One end of the coil is connected to a connection point between the first secondary winding and the second secondary winding. Another end of the coil is connected between the first capacitor and the second capacitor and is connected to an output terminal of the power supply device. The control circuit is connected to the first switching element and the second switching element. The control circuit is configured to control on and off of the first switching element and the second switching element.

Effects of the Invention

According to the present invention, it is possible to reduce a surge voltage caused by occurrence of backflow.

MODE FOR CARRYING OUT THE INVENTION

Hereinafter, an embodiment of the present invention will be described with reference to the drawings.

Figure 1:
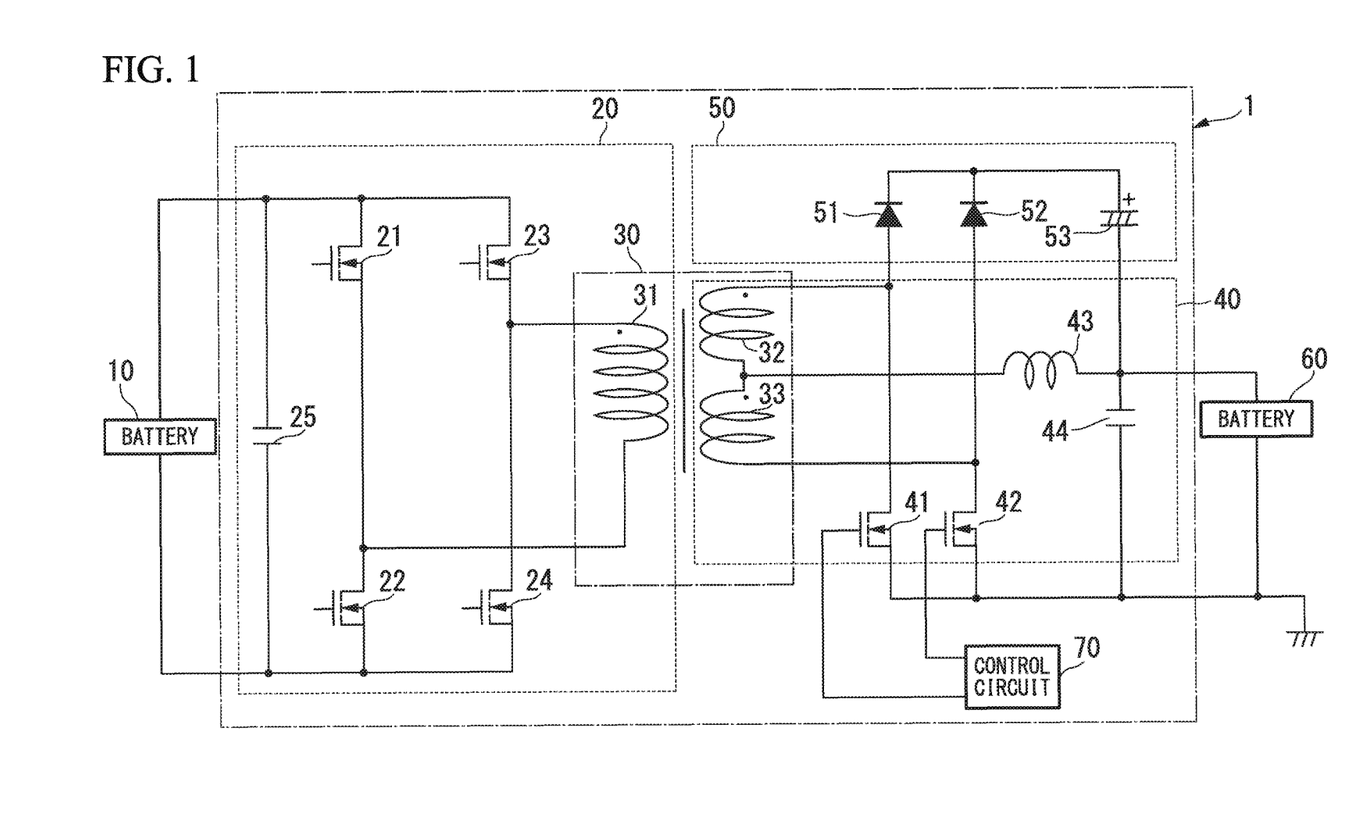
FIG. 1 is a diagram illustrating an example of a configuration of a power supply device according to a present embodiment.

FIG. 1 is a diagram showing an example of a configuration of a power supply device 1 according to the present embodiment. As shown in FIG. 1, the power supply device 1 includes a primary-side circuit 20, a secondary-side circuit 40, a surge protection circuit 50, and a control circuit 70. The power supply device 1 is configured such that the primary-side circuit 20 and the secondary-side circuit 40 are insulated by a transformer 30. A battery 10 is connected to the primary-side circuit 20 of the power supply device 1, and a battery 60 is connected to the secondary-side circuit 40. Here, although an example where the battery 60 is connected as a load is shown in FIG. 1, the load may be another external power source, or the like. Additionally, the battery 60, or a load such as an external power source, may be connected to the power supply device 1 by, for example, a cable.

The primary-side circuit 20 includes a primary winding 31, switching elements 21 to 24, and a capacitor 25.

The switching elements 21 to 24 are, for example, N-channel MOS FETs (field effect transistors). Regarding the switching elements 21 to 24, widths of pulse signals supplied to the respective switching elements are controlled in accordance with control by an unillustrated PWM (pulse width) control circuit. These switching elements 21 to 24 configure a full bridge circuit.

Additionally, when a positive voltage is output, the switching elements 21 and 24 are controlled to enter an on-state by the PWM control circuit, and the switching elements 22 and 23 are controlled to enter an off-state. On the other hand, when a negative voltage is output, the switching elements 22 and 23 are controlled to enter the on-state, and the switching elements 21 and 24 are controlled to enter the off-state. Here, the PWM control circuit controls the widths of the pulse signals, thus controlling a value of the voltage to be supplied to the primary winding 31. The PWM control circuit detects, for example, a voltage between a ground and an output terminal of the power supply device 1, and controls the widths of the pulse signals for the switching elements 21 to 24 so that the detected voltage becomes a predetermined voltage.

The switching elements 21 and 22 are connected in series. A drain of the switching element 21 is connected to a drain of the switching element 23, one end of the capacitor 25, and a positive electrode of the battery 10. A source of the switching element 21 is connected to a drain of the switching element 22 and the other end of the primary winding 31. A gate of the switching element 21 is connected to the PWM control circuit.

A source of the switching element 22 is connected to a source of the switching element 24, the other end of the capacitor 25, and a negative electrode of the battery 10. A gate of the switching element 22 is connected to the PWM control circuit.

The switching elements 23 and 24 are connected in series. A source of the switching element 23 is connected to a drain of the switching element 24 and one end of the primary winding 31. Gates of the switching elements 23 and 24 are connected to the PWM control circuit.

A drain of a switching element 41 of the secondary-side circuit 40 and an anode (input terminal) of a rectifier 51 are connected to one end of the first secondary winding 32. A drain of a switching element 42 of the secondary-side circuit 40 and an anode (input terminal) of a rectifier 52 are connected to one end of the second secondary winding 33. Additionally, the other end of a coil 43, whose one end is connected to the battery 60, is connected to a connection point between the other end of the first secondary winding 32 and the other end of the second secondary winding 33.

The secondary-side circuit 40 includes the first secondary winding 32, the second secondary winding 33, the switching elements 41 and 42, the coil 43, and a first capacitor 44.

The primary winding 31 of the primary-side circuit 20, and the first secondary winding 32 and the second secondary winding 33 of the secondary-side circuit 40, configure the transformer 30.

The switching elements 41 and 42 are, for example, N-channel MOS FETs (field effect transistors). In accordance with control by the control circuit 70, the switching elements 41 and 42 perform synchronous rectification on the power to be generated in the first secondary winding 32 and the second secondary winding 33.

Respective sources of the switching elements 41 and 42 are grounded, and respective gates thereof are connected to the control circuit 70.

One end of the first capacitor is grounded, and the other end thereof is connected to one end of the coil 43 and a negative electrode of the second capacitor 53.

The coil 43 is, for example, a choke coil. The one end of the coil 43 is connected to the battery 60 through the output terminal of the power supply device 1.

The surge protection circuit 50 includes rectifiers 51 and 52, and a second capacitor 53.

The second capacitor 53 is connected in series to the first capacitor 44, and a positive electrode thereof is connected to a cathode (output terminal) of the rectifier 51 and a cathode (output terminal) of the rectifier 52. Here, the surge voltage is voltage-divided in accordance with a capacitance ratio of the first capacitor 44 and the second capacitor 53. For this reason, a capacitance of the second capacitor 53 is set in accordance with a capacitance ratio such that the maximum voltage value of the surge voltage becomes a voltage value less than the breakdown voltages of the switching elements 41 and 42. The capacitance of the second capacitor 53 is set with a value less than, for example, the capacitance of the first capacitor 44. The rectifiers 51 and 52 are, for example, diodes.

The control circuit 70 supplies control signals to the gates of the switching elements 41 and 42, thus performing synchronous rectification operation.

Figure 2:
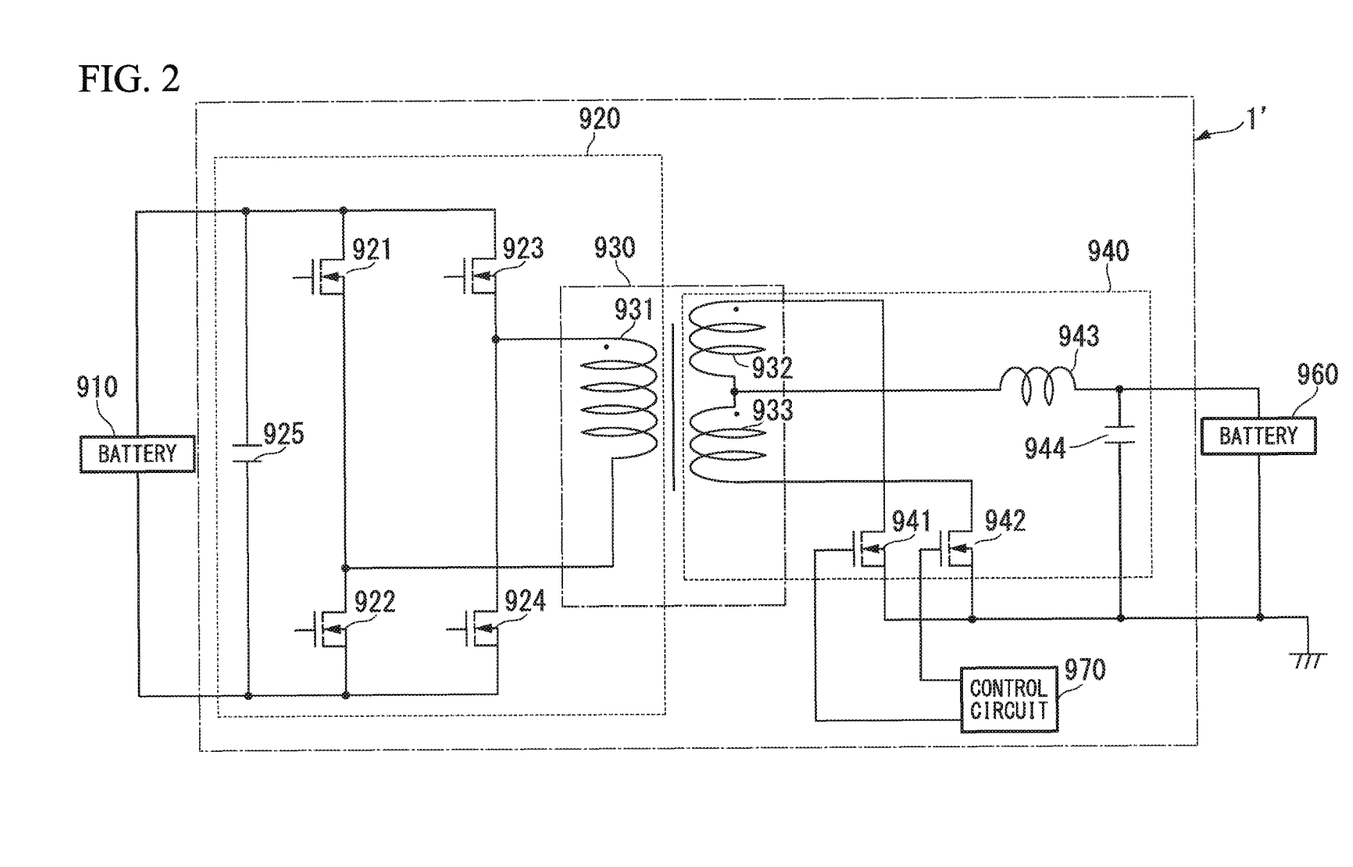
FIG. 2 is a diagram showing an example of a configuration of a power supply device not provided with a surge protection circuit according to a comparative example.
Figure 3:
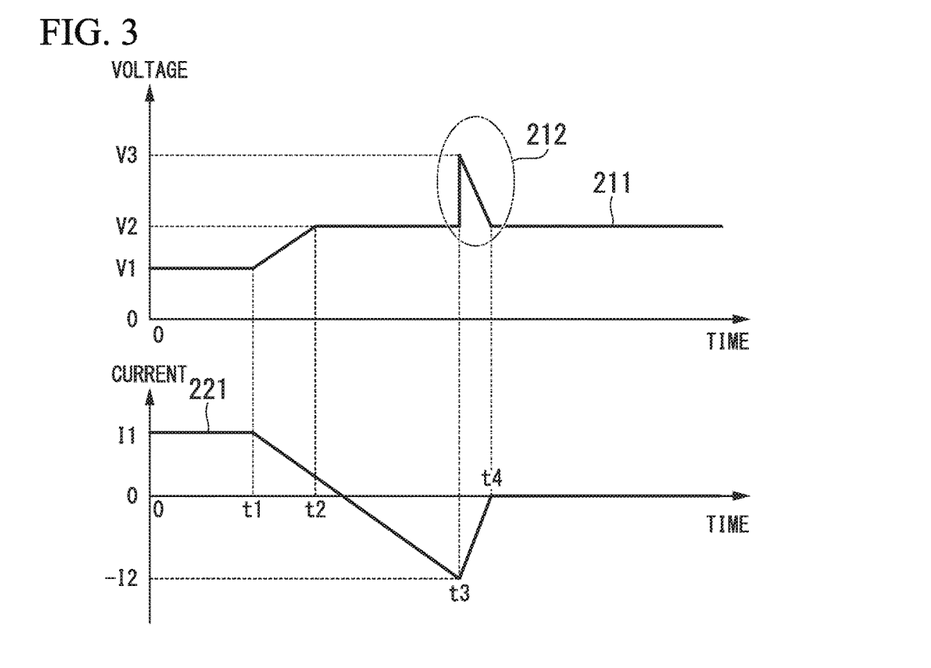
FIG. 3 is a diagram showing an example of a waveform when backflow is occurring in the power supply device of the comparative example.

Next, a principle that the voltage value of the battery 60 becomes higher than the output voltage value of the secondary-side circuit 40, backflow occurs in the power supply device 1, and thereafter a surge voltage is generated, will be described with reference to FIGS. 2 and 3. FIG. 2 is a diagram showing an example of a configuration of a power supply device 1' not provided with a surge protection circuit according to a comparative example. FIG. 3 is a diagram showing an example of a waveform when backflow is occurring in the power supply device 1' not provided with a surge protection circuit according to the present embodiment.

As shown in FIG. 2, the power supply device 1' includes a primary-side circuit 920, a secondary-side circuit 940, and a control circuit 970. A battery 910 is connected to a primary side of the power supply device 1', and a battery 960 is connected to a secondary side thereof. The configuration of the power supply device 1' is the configuration of the power supply device 1 shown in FIG. 1 excluding the surge protection circuit 50. The primary-side circuit 920 corresponds to the primary-side circuit 20 of the power supply device 1, a transformer 930 corresponds to the transformer 30 of the power supply device 1, the secondary-side circuit 940 corresponds to the secondary-side circuit 40 of the power supply device 1, and the control circuit 970 corresponds to the control circuit 70 of the power supply device 1.

The primary-side circuit 920 includes a primary winding 931, switching elements 921 to 924, and a capacitor 925. The switching elements 921 to 924 correspond to the switching elements 21 to 24 of the power supply device 1, and the capacitor 925 corresponds to the capacitor 25 of the power supply device 1.

The secondary-side circuit 940 includes a first secondary winding 932, a second secondary winding 933, switching elements 941 and 942, a coil 943, and a capacitor 944. The switching elements 941 and 942 correspond to the switching elements 41 and 42 of the power supply device 1, the coil 943 corresponds to the coil 43 of the power supply device 1, and the capacitor 944 corresponds to the first capacitor 44 of the power supply device 1.

The primary winding 931 of the primary-side circuit 920, and the first secondary winding 932 and the second secondary winding 933 of the secondary-side circuit 940 configure the transformer 930. The primary winding 931 corresponds to the primary winding 31 of the power supply device 1, the first secondary winding 932 corresponds to the first secondary winding 32 of the power supply device 1, and the second secondary winding 933 corresponds to the second secondary winding 33 of the power supply device 1.

Respective components of the above-mentioned primary-side circuit 920, the transformer 930, the secondary-side circuit 940, and the control circuit 970, and connection relationships thereamong, are the same as those of the power supply system 1 shown in FIG. 1.

In FIG. 3, a horizontal axis represents time, and a vertical axis of an upper waveform represents an output voltage value, and a vertical axis of a lower waveform represents an output current value. In FIG. 3, a waveform 211 represents a waveform showing a change in output voltage value over time, and a waveform in a region surrounded by a reference numeral 212 represents a waveform caused by a surge voltage. In FIG. 3, a waveform 221 represents a waveform showing a change in output voltage value over time. Here, the output voltage in FIG. 3 is equal to a voltage at the both ends of the capacitor 944 shown in FIG. 2.

In FIG. 3, in a period from time 0 to time t1, a voltage value of the battery 960 and an output voltage value of the secondary-side circuit 940 are equal to a voltage value V1. In this period, an output current value is I1.

In a period from time t1 to time t2, the voltage of the battery 960 increases from V1 to V2, as indicated by the waveform 211. Here, the voltage value V2 is greater than the voltage value V1.

In a case where the voltage of the battery 960 increases from V1 to V2, the switching elements 941 and 942 are short-circuited, a current in accordance with the increase in voltage flows from the battery 960 through the coil 943 to the second secondary winding 933 of the transformer 930. In the second secondary winding 933, a current flows from a connection point between the second secondary winding 933 and the second secondary winding 933 to the drain of the switching element 942. Consequently, after time t1, the current value decreases from I1, and backflow occurs, as indicated by the waveform 221 shown in FIG. 3.

The current flows in the second secondary winding 933, and thereby a current is generated in the primary winding 931 magnetically coupled to the second secondary winding 933. A current is generated from the other end, connected to the drain, of the switching element 922 to the one end, connected to the source, of the switching element 923.

Then, by the current being generated in the primary winding 931, the current flows from the source of the switching element 923 to the drain thereof, and further flows from the drain of the switching element 923 to the positive electrode of the battery 910.

In FIG. 3, when the output current value reaches −I2, synchronous rectification operation is terminated at the timing of time t3. Here, the current value −I2 is less than 0 [A (ampere)].

Consequently, in the period from time t3 to time t4, the current value changes from −I2 to 0, as indicated by the waveform 221. Thereby, in the power supply device 1', in the period from time t3 to time t4, the synchronous rectification is terminated so that the switching elements 941 and 942 are turned off. Then, the energy charged in the coil 943 causes a surge voltage to be generated between the source and the drain of the switching elements 941 and 942 (reference numeral 212). The maximum value of the generated surge voltage is, for example, V3, as indicated by the reference numeral 212 shown in FIG. 3. This voltage value V3 is greater than the voltage value V2.

The surge voltage generated in such a manner affects the load connected to the power supply device 1' and the switching elements 941 and 942 in some cases. If the surge voltage exceeds the breakdown voltages of the switching elements 941 and 942, this surge voltage causes breakdown of the switching elements 941 and 942 in some cases.

Next, operation of the power supply device 1 will be described.

Figure 4:
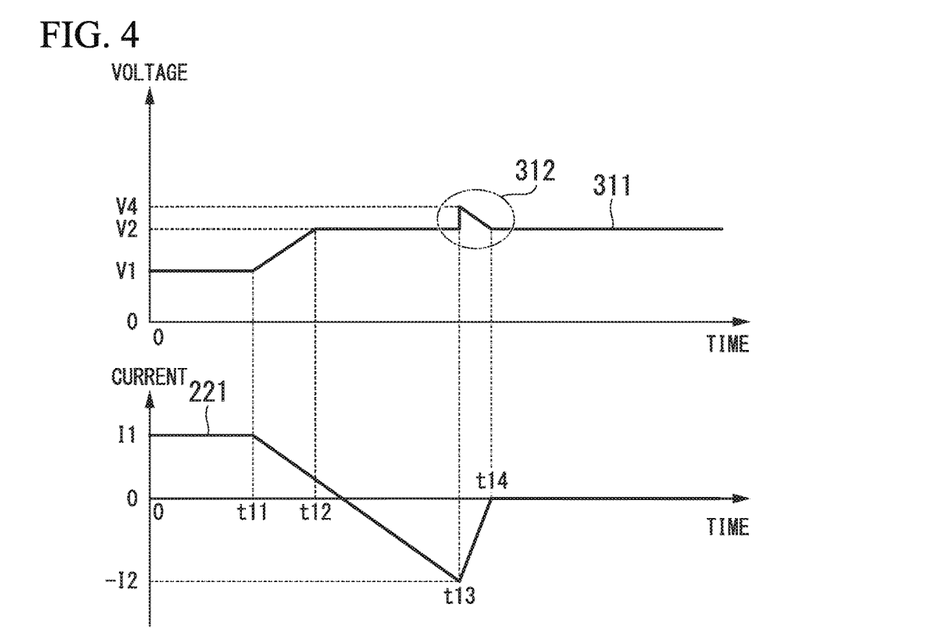
FIG. 4 is a diagram showing an example of a waveform when backflow is occurring in the power supply device of the present embodiment.

FIG. 4 is a diagram showing an example of a waveform when backflow is occurring in the power supply device 1 according to the present embodiment. In FIG. 4, a horizontal axis represents time, a vertical axis of an upper waveform represents an output voltage value, and a vertical axis of a lower waveform represents an output current value. A waveform 311 represents a waveform showing a change in output voltage value over time, and a waveform in a region surrounded by a reference numeral 312 represents a waveform caused by a surge voltage.

In a period from time 0 to time t13, the power voltage device 1 operates similarly to the power voltage device 1'.

In a period from the time t13 to time t14, as indicated by the reference numeral 312, since the synchronous rectification is terminated, the energy charged in the coil 43 is voltage-divided and charged into the first capacitor 44 and the second capacitor 53 through the rectifiers 51 and 52 connected to the respective drains of the switching elements 41 and 42. Then, the voltage applied between the source and the drain of the switching elements 41 and 42 is equal to the voltage applied between both ends of the first capacitor 44.

Then, in a period from time t3 to time t4, the current value changes from −I2 to 0, as indicated by the waveform 221. Thereby, in the power supply device 1, in the period from time t13 to time t14, as indicated by the waveform 312, the synchronous rectification is terminated so that the switching elements 41 and 42 are turned off. Then, the energy charged in the coil 43 causes a surge voltage to be generated between the source and the drain of the switching element 41 and 42. The maximum value of the generated surge voltage is, for example, V4. This voltage value V4 is a voltage value less than the breakdown voltages of the switching elements 41 and 42. Here, since the generated surge voltage is voltage-divided and charged into the first capacitor 44 and the second capacitor 53, V4, the value of the voltage charged in the first capacitor 44, becomes less than V3 (FIG. 3), compared to the power supply device 1' not provided with the second capacitor 53. For example, assuming that the capacitance of the first capacitor 44 is the same as that of the second capacitor 53, the voltage V4 voltage-divided and charged into the first capacitor 44 becomes half the surge voltage V3 described with reference to FIG. 2.

The maximum voltage value V3 of the surge voltage generated in the power supply device 1' is greater than, for example, the breakdown voltages of the switching elements 41 and 42. On the other hand, in the power supply device 1 of the present embodiment, even in a case where the breakdown voltages of the power supply device 1' and the switching elements 41 and 42 are the same as in conventional cases, the surge voltage is voltage-divided and charged into the first capacitor 44 and the second capacitor 53. This can reduce the maximum voltage value of the surge voltage applied between the source and drain of the switching elements 41 and 42 to V4 that is less than V3, thus making the maximum voltage value less than the breakdown voltages of the switching elements 41 and 42. Consequently, according to the present embodiment, it is possible to prevent breakdown of the switching elements 41 and 42 caused by the surge voltage.

Here, the capacitance of the second capacitor 53 may be obtained by, for example, experiments, in accordance with the level of the expected surge voltage and the breakdown voltages of the switching elements 41 and 42. As the capacitance of the second capacitor 53 decreases, a voltage value allowable to the switching elements 41 and 42 becomes smaller. As the capacitance increases, a voltage value allowable to the switching elements 41 and 42 becomes greater.

As explained above, the power supply device 1 of the present embodiment includes: a rectifier (51 or 52) having an input terminal (e.g., an anode) connected to one end (e.g., a drain) of a switching element (41 or 42) configured to perform synchronous rectification; a coil 43 having one end connected to an output terminal of the power supply device 1; and a second capacitor 53 connected in series to a first capacitor 44, the first capacitor 44 having one end grounded, the second capacitor 53 having one end connected to a connection point between another end of the first capacitor 44 and the one end of the coil 43, and the second capacitor 53 having another end connected to an output terminal (e.g., a cathode) of the rectifier (51 or 52).

According to the power voltage device 1 of the present embodiment, even if a surge voltage is generated due to an occurrence of backflow, this configuration enables the generated surge voltage to be voltage-divided and charged into the first capacitor 44 and the second capacitor 53. For this reason, compared to the case where the second capacitor 53 is not provided, a value of the voltage charged in the first capacitor 44 becomes smaller, thus making it possible to reduce the level of the surge voltage caused by the occurrence of the backflow. Consequently, even if a surge voltage is generated by an occurrence of backflow, it is possible to prevent an excessive voltage from being applied through the first secondary winding 32 and the second secondary winding 33 to the switching elements 41 and 42 for synchronous rectification and the load.

Additionally, other than the above-described prevention by the surge protection circuit 50 of the surge voltage caused by the occurrence of the backflow, even if noises are generated by an instantaneous large change in voltage occurring in the secondary side circuit 40, the generated noise signal is voltage-divided into the first capacitor 44 and the second capacitor 53. Consequently, according to the present embodiment, even if noises are generated by an instantaneous large change in voltage, other than the surge voltage caused by backflow, it is possible to prevent an excessive voltage from being applied to the switching elements 41 and 42 and the load.

Although the embodiment of the present invention has been described above, various modification, replacement, addition, and the like, may be made without departing from the scope of the present invention.

For example, as the example of the secondary-side circuit 40, the description has been given in the present embodiment with respect to the configuration that synchronous rectification is performed using the two switching elements 41 and 42. However, the configuration is not limited thereto. As long as a circuit includes one or more switching elements, the present invention is applicable. For example, in a case where one switching element is provided, the surge protection circuit may include one rectifier and the second capacitor 53. Additionally, in a case where the secondary-side circuit 40 has, for example, three-phase outputs, and includes three switching elements, the surge protection circuit may include three rectifiers and the second capacitors 53. Further, the second capacitor 53 may be configured by a plurality of capacitors in accordance with the area of a base board of the power supply device 1 and the size of the device.

The description has been given in the above embodiment with respect to the case where the circuits of the primary-side circuit 20 are configured by a full bridge circuit. However, the configuration is not limited to the full bridge circuit as long as the rectifier circuit of the secondary-side circuit 40 is configured by a synchronous rectification circuit. For example, a circuit type of the primary-side circuit 20 may be a circuit type of non-resonant PWM control, or a switching power supply device configured by a phase-shift switching circuit.

Additionally, the power supply device 1 may further include a backflow detection circuit. The backflow detection circuit detects, for example, a current flowing in the switching element 41 or 42. When it is detected that backflow occurs, the backflow detection circuit may output to the control circuit 70, a signal indicating that the backflow has occurred. The control circuit 70 may, in accordance with the signal received from the backflow detection circuit, control the switching elements 41 and 42 to terminate synchronous rectification. Even in this case, according to the present embodiment, the surge voltage generated when the synchronous rectification is terminated is voltage-divided into the first capacitor 44 and the second capacitor 54, thus making it possible to prevent breakdown of the switching elements 41 and 42 caused by the surge voltage.

Additionally, the example where the transformer 30 of the power supply device 1 insulates the primary-side circuit 20 from the secondary-side circuit 40, thus transforming the voltage has been shown in the present embodiment. However, the configuration is not limited thereto as long as the secondary-side circuit 40 includes a circuit that performs synchronous rectification. Further, transformation may be performed using a charge pump circuit or the like using no transformer.

Here, in the above-described power supply device 1, each processor in the control circuit 70 may be one that is implemented by dedicated hardware, or one whose functions are implemented by recording on a computer-readable recording medium, a program for implementing the functions of each processor, and causing a computer system to read and execute the program recorded on this recording medium.

In other words, part or all of the processing functions of the control circuit 70 may be implemented by mounting in the above-described control circuit 70, a micro controller including a CPU, a ROM, a RAM, and the like, or a computer system such as a microcomputer, and causing the CPU to read and execute a software program.

DESCRIPTION OF REFERENCE SYMBOLS

1 . . . power supply device
10, 60 . . . battery
20 . . . primary-side circuit
21 to 24, 41, 42 . . . switching element
25 . . . capacitor
30 . . . transformer
31 . . . primary winding
32 . . . first secondary winding
33 . . . second secondary winding
40 . . . secondary-side circuit
44 . . . first capacitor
50 . . . surge protection circuit
51, 52 . . . rectifier
53 . . . second capacitor
70 . . . control circuit

The invention claimed is:

1. A power supply device comprising:
a transformer including a primary winding and a first secondary winding;
a first switching element on a secondary side of the transformer, the first switching element being configured to perform synchronous rectification;
a first rectifier on the secondary side of the transformer, the first rectifier being connected in series to the first switching element, one end of the first secondary winding being connected between the first switching element and the first rectifier;
a first capacitor and a second capacitor on the secondary side of the transformer, the first capacitor and the second capacitor being connected directly in series, the first capacitor including first and second electrodes, the second capacitor including third and fourth electrodes, the first electrode being connected directly to the first switching element and a ground, the second electrode being connected to the third electrode, and the fourth electrode being connected to the first rectifier; and
a coil on the secondary side of the transformer, one end of the coil being connected to an other end of the first secondary winding, an other end of the coil being connected between the second electrode of the first capacitor and the third electrode of the second capacitor and being connected to a battery via an output terminal, on the secondary side, of the power supply device,
wherein the first capacitor and the second capacitor are configured to charge by voltage-dividing, via the first rectifier, a first surge voltage to be generated in the first switching element by energy supplied from the battery and charged in the coil in a first case that the battery becomes larger in voltage than the output terminal, and the first switching element is turned off.

2. The power supply device according to claim 1, further comprising
a second switching element on the secondary side of the transformer, the second switching element being configured to perform synchronous rectification;
a second rectifier on the secondary side of the transformer, the second rectifier being connected in series to the second switching element, wherein
the transformer further includes a second secondary winding,
one end of the second secondary winding being connected to the other end of the first secondary winding, an other end of the second secondary winding being connected between the second switching element and the second rectifier,
the first electrode of the first capacitor is connected directly to the first switching element, the second switching element, and the ground,
the fourth electrode of the second capacitor is connected directly to the first rectifier and the second rectifier, and
the first capacitor and the second capacitor are configured to charge by voltage-dividing, via the first rectifier and the second rectifier, a second surge voltage to be generated in the first switching element and the second switching element by energy supplied from the battery and charged in the coil in a second case that the battery becomes larger in voltage than the output terminal, and the first switching element and the second switching element are turned off.

3. A power supply device comprising:
a transformer including a primary winding, a first secondary winding, and a second secondary winding;
a first series circuit on a secondary side of the transformer, the first series circuit including a first switching element configured to perform synchronous rectification and a first rectifier connected in series to the first switching element, wherein one end of the first secondary winding is connected between the first switching element and the first rectifier;
a second series circuit on the secondary side of the transformer, the second series circuit including a second switching element configured to perform synchronous rectification and a second rectifier connected in series to the second switching element, the second series circuit being connected in parallel to the first series circuit, wherein one end of the second secondary winding is connected between the second switching element and the second rectifier;
a third series circuit on the secondary side of the transformer, the third series circuit including a first capacitor and a second capacitor connected directly in series, the third series circuit being connected in parallel to the first series circuit and the second series circuit, the first capacitor including first and second electrodes, the second capacitor including third and fourth electrodes, the first electrode being connected directly to the first switching element, the second switching element, and a ground, the second electrode being connected to the third electrode, and the fourth electrode being connected to the first rectifier and the second rectifier;
a coil on the secondary side of the transformer, one end of the coil being connected to a connection point between the first secondary winding and the second secondary winding, and another end of the coil being connected between the second electrode of the first capacitor and third electrode of the second capacitor and being connected to a battery via an output terminal, on the secondary side, of the power supply device; and
a control circuit on the secondary side of the transformer, the control circuit being connected to the first switching element and the second switching element, and the control circuit being configured to control on and off of the first switching element and the second switching element, wherein the first capacitor and the second capacitor are configured to charge by voltage-dividing, via the first rectifier and the second rectifier, a surge voltage to be generated in the first switching element and the second switching element by energy supplied from the battery and charged in the coil in a case that the battery becomes larger in voltage than the output terminal, and the first switching element and the second switching element are turned off.

4. The power supply device according to claim 3, wherein a capacitance of the second capacitor is set in accordance with a capacitance ratio of the first switching element and the second switching element, and the capacitance ratio is set larger than a maximum voltage value of the surge voltage.

5. The power source device according to claim 3, wherein the capacitance of the second capacitor is set smaller than a capacitance of the first capacitor.

* * * * *